United States Patent
Mori

(10) Patent No.: US 8,035,706 B2
(45) Date of Patent: Oct. 11, 2011

(54) IMAGE PROCESSING APPARATUS AND DIGITAL CAMERA

(75) Inventor: Munehiro Mori, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 427 days.

(21) Appl. No.: 12/394,767

(22) Filed: Feb. 27, 2009

(65) Prior Publication Data
US 2009/0225194 A1    Sep. 10, 2009

(30) Foreign Application Priority Data

Mar. 10, 2008  (JP) .................................. 2008-059024

(51) Int. Cl.
*H04N 5/208* (2006.01)
*H04N 5/228* (2006.01)
*H04N 5/217* (2011.01)

(52) U.S. Cl. ...................... 348/252; 348/222.1; 348/241

(58) Field of Classification Search ............. 348/207.99, 348/208.12, 208.13, 222.1, 241, 234, 235, 348/238, 236, 237, 252, 266, 272
See application file for complete search history.

(56) References Cited

U.S. PATENT DOCUMENTS

| 6,897,897 | B2* | 5/2005 | Mise et al. ..................... 348/252 |
| 2006/0061673 | A1* | 3/2006 | Hiroshige et al. ............ 348/252 |
| 2008/0152222 | A1* | 6/2008 | Takeuchi ...................... 382/167 |
| 2008/0284916 | A1* | 11/2008 | Ikeda ............................ 348/712 |
| 2008/0292204 | A1* | 11/2008 | Itoh ............................... 382/266 |

FOREIGN PATENT DOCUMENTS

JP    8-275185    10/1996

* cited by examiner

*Primary Examiner* — David Ometz
*Assistant Examiner* — Peter Chon
(74) *Attorney, Agent, or Firm* — Oblon, Spivak, McClelland, Maier & Neustadt, L.L.P.

(57) ABSTRACT

Contour extraction circuits extract contour components YE, CbE, and CrE, respectively, from luminance signal Y, and color-difference signals Cb and Cr, respectively. The two contour components CbE and CrE of the color difference signals are inputted to the LUTs respectively, via the selectors respectively, and converted into the adjustment signals K1 and K2, respectively. The multiplier multiplies the contour component YE by the adjustment signal K1 so as to generate the modulated contour component E1. The multiplier multiplies the modulated contour component E1 by the adjustment signal K2 so as to generate the modulated contour component E2. The adder adds the modulated contour component E2 to the luminance signal Y so as to generate the luminance signal Ya, which has been contour-enhanced based on the contour component of the luminance signal and the contour components of the color-difference signals.

11 Claims, 4 Drawing Sheets

US 8,035,706 B2

IMAGE PROCESSING APPARATUS AND DIGITAL CAMERA

BACKGROUND OF THE INVENTION

1. Field of the Invention

The present invention relates to an image processing apparatus which enhances a luminance signal contained in an image so as to improve the resolution feeling (sharpness) of a captured image or the like.

2. Description of the Background Art

Image capture devices such as digital cameras and digital movie cameras generally perform contour enhancement processing to improve the resolution feeling of a captured image. In an image processing apparatus of a digital camera or the like, a Laplacian filter is applied to a luminance signal or the like to extract a contour component therefrom. The extracted contour component is added to the luminance signal, which is the original signal, so as to enhance the contour of the luminance signal.

A contour enhancement processing is performed using the contour component extracted from a luminance signal so as to improve the resolution feeling of an image having a large brightness difference easily and effectively. However, for example, when an image has a small brightness difference, or includes a black area on a red background (especially, including a boundary between deep red and black), it is difficult to extract the contour component, making it impossible to effectively improve the resolution feeling of the image.

In Japanese Patent Application Laid-open No. H8-275185, the contour component of a color signal is extracted, and the contour component of a luminance signal is reduced in size according to the size of the contour component of the color signal. More specifically, one control signal is generated based on the contour components of two color-difference signals, and then it is determined based on the generated control signal whether the contour component of the luminance signal is reduced to ¼.

SUMMARY OF THE INVENTION

An image processing apparatus of the present invention includes: an element for extracting a luminance signal, a first color-difference signal, and a second color-difference signal from a pixel signal; a luminance contour extraction element for extracting a luminance contour component from the luminance signal; a first contour extraction element for extracting a first contour component from the first color-difference signal; a second contour extraction element for extracting a second contour component from the second color-difference signal; a modulation element for modulating the luminance contour component based on the first contour component, and also modulating the luminance contour component based on the second contour component, thereby generating a modulated contour component; and an enhancing element for contour-enhancing the luminance signal by adding the modulated contour component to the luminance signal.

According to the present invention, the contour component of the luminance signal can be enhanced using the contour components of the two color-difference signals. This effectively enhances, for example, a contour having a small brightness difference or a black contour on a red background, thereby improving the resolution feeling of the image.

An image processing apparatus of the present invention includes: an element for extracting a luminance signal and a color-difference signal from a pixel signal; a luminance contour extraction element for extracting a luminance contour component from the luminance signal; a color-difference contour extraction element for extracting a color-difference contour component from the color-difference signal; and an enhancing element for contour-enhancing the luminance signal by adding the luminance contour component to the luminance signal, and adding the color-difference contour component to the luminance signal.

Adding the contour component of the luminance signal and the contour component of the color-difference signal individually to the luminance signal as the original signal allows a contour having a small brightness difference to be contour-enhanced, thereby improving the resolution feeling of the image.

In another aspect of the present invention, the color-difference signal includes a first color-difference signal and a second color-difference signal; the color-difference contour extraction element includes a first contour extraction element for extracting a first contour component from the first color-difference signal and a second contour extraction element for extracting a second contour component from the second color-difference signal; the enhancing element adds the first contour component and the second contour component as the color-difference contour component to the luminance signal.

Since the contour components of the color-difference signals are individually added to the luminance signal as the original signal, if a contour component is extracted from one of the color-difference signals, the resolution feeling of the image can be improved.

Thus, an object of the present invention is to provide a technique for improving the resolution feeling of an image by subjecting an image having a small brightness difference to effective contour enhancement processing.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
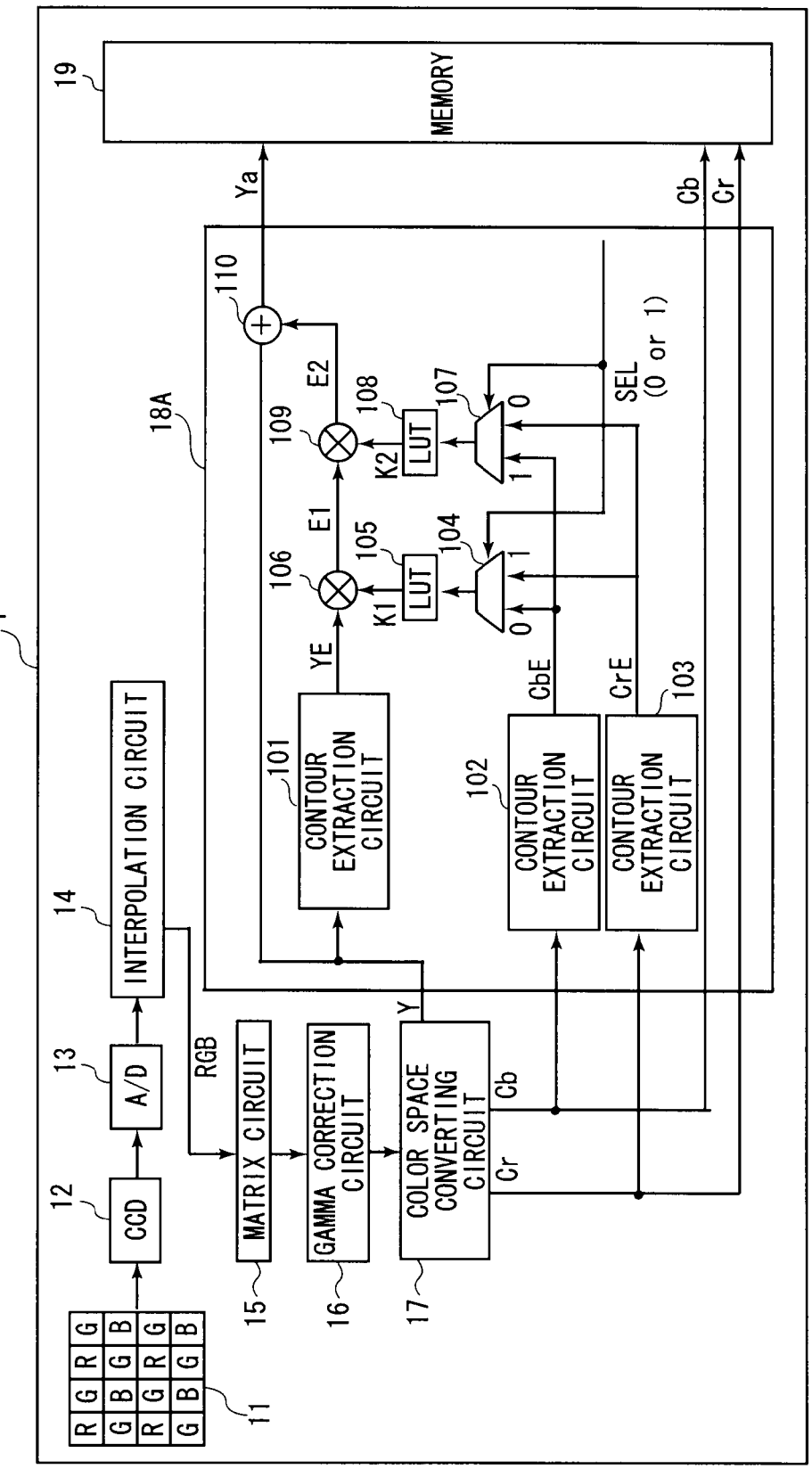
FIG. 1 is a block diagram of a digital camera according to a first embodiment.

The embodiments of the present invention will be described as follows with reference to the drawings. FIG. 1 is a block diagram of a digital camera 1 according to a first embodiment.

The digital camera 1 includes a color filter array 11, a CCD (Charge Coupled Devices) 12, an A/D converter 13, an interpolation circuit 14, a matrix circuit 15, a gamma correction circuit 16, a color space converting circuit 17, a contour enhancement processor 18A, and a memory 19.

The CCD 12 having the color filter array 11, which is an RGB Bayer Array, captures and produces a subject image through an unillustrated optical system. The CCD 12 outputs an analog pixel signal, which is converted into a digital pixel signal by the A/D converter 13. As the image pickup device, a CMOS sensor can be used instead of the CCD. The color filter array can be a complementary filter.

Since the color filter array 11 is an RGB Bayer Array, the pixel signal outputted from the A/D converter 13 is a signal having a color component of one of RGB per pixel. This pixel signal is interpolated by the interpolation circuit 14 and converted into a pixel signal having the color components of all of RGB per pixel.

The pixel signal outputted from the interpolation circuit 14 is subjected to color correction by the matrix circuit 15 in order to improve color reproducibility. The pixel signal outputted from the matrix circuit 15 is subjected to gamma correction by the gamma correction circuit 16. The pixel signal outputted from the gamma correction circuit 16 is subjected to color space conversion by the color space converting circuit 17 so as to be converted from an RGB color space into a YCbCr color space.

The pixel signal converted into the YCbCr color space by the color space converting circuit 17 is inputted to the contour enhancement processor 18A. The contour enhancement processor 18A performs a process to enhance the contour of a captured image and to improve the resolution feeling of the captured image.

The contour enhancement processor 18A includes contour extraction circuits 101, 102, and 103. The contour extraction circuit 101 receives a luminance signal Y and extracts a contour component YE therefrom. The contour extraction circuit 102 receives a color-difference signal Cb and extracts a contour component CbE therefrom. The contour extraction circuit 103 receives a color-difference signal Cr and extracts a contour component CrE therefrom. The method for contour extraction by the contour extraction circuits 101, 102, and 103 is not particularly limited. For example, it can be done using a contour extraction filter such as a Laplacian filter.

The contour component CbE extracted by the contour extraction circuit 102 is inputted to the selectors 104 and 107. The contour component CrE extracted by the contour extraction circuit 103 is also inputted to the selectors 104 and 107.

The selectors 104 and 107 receive a selection signal SEL from an unillustrated control circuit, and switch between output signals. Upon receiving a selection signal SEL "0", the selector 104 outputs the contour component CbE received from the contour extraction circuit 102 to a look-up table (hereinafter, LUT) 105. Upon receiving a selection signal SEL "1", the selector 104 outputs the contour component CrE received from the contour extraction circuit 103 to the LUT 105.

Upon receiving a selection signal SEL "0", the selector 107 outputs the contour component CrE received from the contour extraction circuit 103 to the LUT 108. Upon receiving a selection signal SEL "1", the selector 107 outputs the contour component CbE received from the contour extraction circuit 102 to the LUT 108.

The LUT 105 includes a correspondence table for converting the contour component CbE or CrE received from the selector 104 into an adjustment signal K1. The LUT 108 includes a correspondence table for converting the contour component CbE or CrE received from the selector 107 into an adjustment signal K2.

Figure 2:
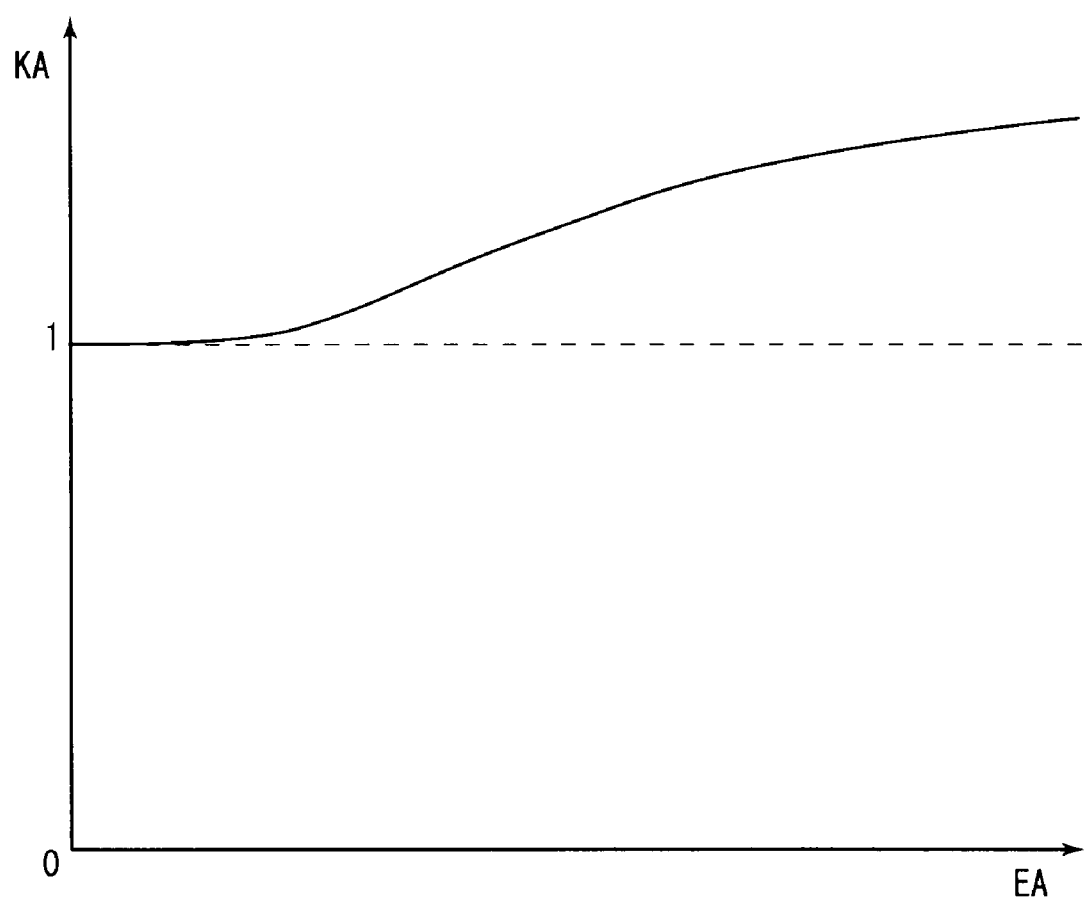
FIG. 2 shows an example of a look-up table.

FIG. 2 shows an example of the correspondence table used in the LUTs 105 and 108. In FIG. 2, the horizontal axis represents a signal value of a contour component EA (the contour component CbE or CrE), which is an input signal, and the vertical axis represents a signal value of an adjustment signal KA (the adjustment signal K1 or K2). In the present embodiment, as shown in FIG. 2, the adjustment signal KA has a value of 1 or more. In other words, the adjustment signal KA acts to increase the amplitude of the contour component YE of the luminance signal Y.

Although FIG. 2 shows an example of the correspondence table used in the LUTs 105 and 108, the LUTs 105 and 108 can use different correspondence tables from each other. For example, it is possible to generate adjustment signals KA having different characteristics from each other based on the color-difference signals Cb and Cr. It is also possible to weight the contour components of the color-difference signals Cb and Cr by adjusting the correspondence tables used by the LUTs 105 and 108.

The adjustment signal K1 outputted from the LUT 105 is inputted to a multiplier 106. The multiplier 106 multiplies the contour component YE of the luminance signal Y by the adjustment signal K1 and outputs a modulated contour component E1. As described above, in the present embodiment, the adjustment signal K1 has a value of 1 or more, and acts to increase the amplitude of the contour component YE. This enables the contour component extracted from the color-difference signal to act to enhance the contour component of the luminance signal.

The adjustment signal K2 outputted from the LUT 108 is inputted to a multiplier 109. The multiplier 109 multiplies the modulated contour component E1 by the adjustment signal K2 and outputs a modulated contour component E2. As described above, in the present embodiment, the adjustment signal K2 has a value of 1 or more, and acts to increase the amplitude of the contour component YE. This enables the contour component extracted from the color-difference signal to act to enhance the contour component of the luminance signal.

The modulated contour component E2 outputted from the multiplier 109 is inputted to an adder 110. The adder 110 adds the modulated contour component E2 to the luminance signal Y outputted from the color space converting circuit 17. As a result, a luminance signal Ya is generated, which has been contour-enhanced. The contour-enhanced luminance signal Ya and the color-difference signals Cb and Cr are stored in the memory 19.

The image signal composed of the luminance signal Ya and the color-difference signals Cb and Cr which are stored in the memory 19 is, for example, either displayed on an unillustrated monitor of the digital camera 1 or stored in a memory card or the like attached to the digital camera 1.

Thus, the digital camera 1 according to the first embodiment extracts a contour component from a color-difference signal and modulates the contour component of a luminance signal by the contour component of the color-difference signal. This effectively enhances, for example, a contour having a small brightness difference or a black contour on a red background, thereby improving the resolution feeling of the image. It goes without saying that the resolution feeling of the image is further effectively improved in the area from which changes both in luminance and color difference have been detected.

The digital camera 1 according to the first embodiment can switch the order in which the contour components CbE and CrE are acted using the selectors 104 and 107. The difference in the bit precision of the multipliers 106 and 109 or other conditions may cause the obtained calculation results to vary depending on the order of action. However, changing the order of action freely allows the contour components to be modulated to have different characteristics from each other.

In the first embodiment, as shown in FIG. 2, the LUTs 105 and 108 output a value of 1 or more as the adjustment signal KA. In other words, the contour component of a luminance signal is enhanced by the contour component of a color-difference signal. Alternatively, it is possible to output a value of less than 1 as the adjustment signal KA.

When a value of less than 1 is used as the adjustment signal KA, the bit precision of the multiplier 106 may cause the modulated contour component E1 to be 0 as the product of the adjustment signal K1 and the contour component YE. In this case, the multiplication result of the multiplier 109 always becomes 0, making it impossible to reflect the amplitude of a contour component to be outputted from the selector 107 on the contour component of a luminance signal. Such cases can be avoided by switching between the selectors 104 and 107, thereby controlling the calculation results of the multiplier 106 not to be 0.

Even if the adjustment signal KA is a value of 1 or more, when the contour component YE of the luminance signal and the contour component of one of the color difference components are very small, the calculation results of the multiplier 106 can be 0. In such cases, the contour component of the other color-difference signal can be used effectively by switching between the selectors 104 and 107.

Second Embodiment

Figure 3:
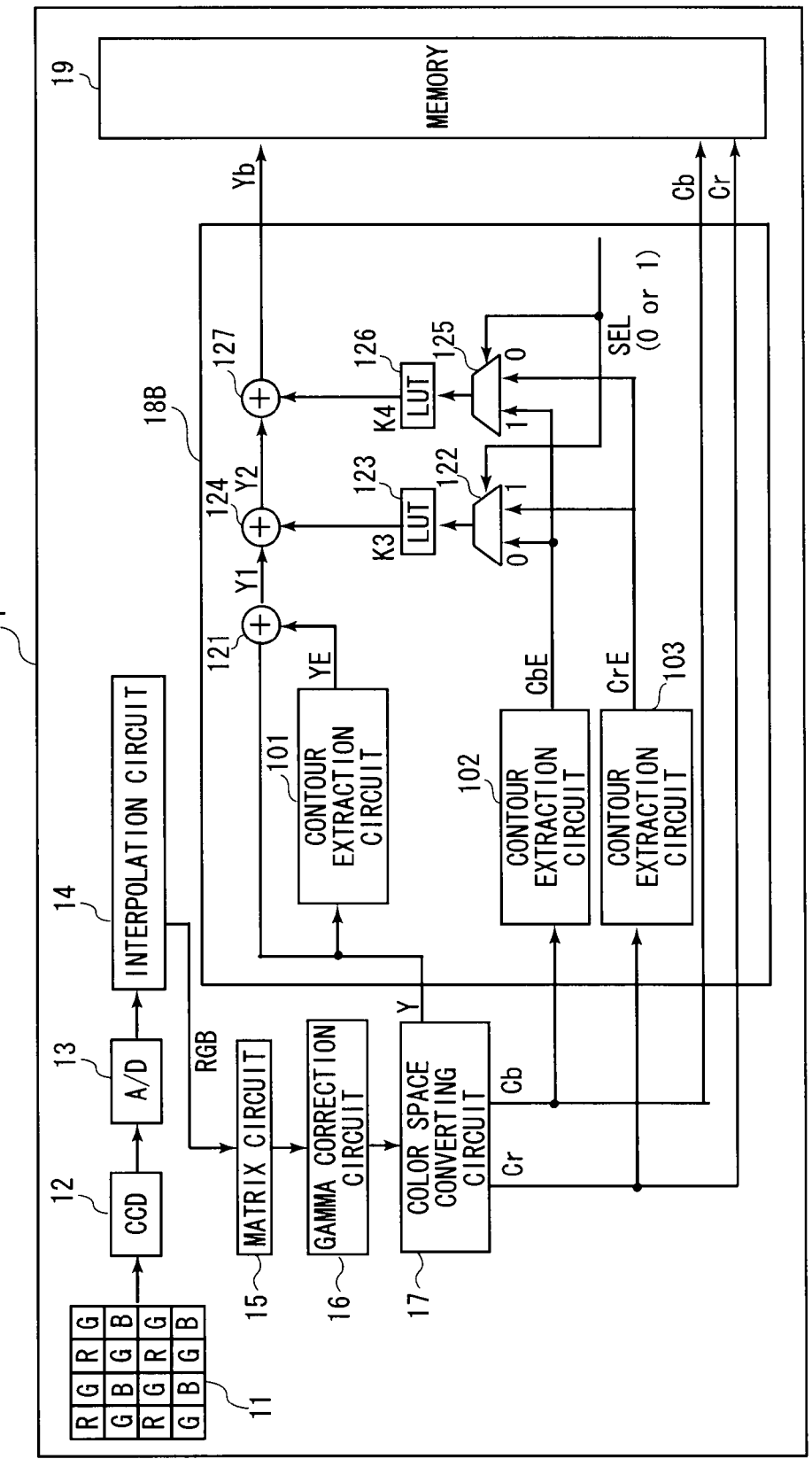
FIG. 3 is a block diagram of a digital camera according to a second embodiment.

FIG. 3 is a block diagram of a digital camera 1 according to a second embodiment. The digital camera 1 includes a color filter array 11, a CCD 12, an A/D converter 13, an interpolation circuit 14, a matrix circuit 15, a gamma correction circuit 16, and a color space converting circuit 17, which are identical to those in the first embodiment.

A pixel signal converted into a YCbCr color space by the color space converting circuit 17 is inputted to a contour enhancement processor 18B. The contour enhancement processor 18B performs a process to enhance the contour of a captured image and to improve the resolution feeling of the captured image.

The contour enhancement processor 18B includes contour extraction circuits 101, 102, and 103. Contour extraction circuit 101 receives a luminance signal Y and extracts a contour component YE therefrom. The contour extraction circuit 102 receives a color-difference signal Cb and extracts a contour component CbE therefrom. The contour extraction circuit 103 receives a color-difference signal Cr and extracts a contour component CrE therefrom.

The contour component CbE outputted from the contour extraction circuit 102 is inputted to selectors 122 and 125. The contour component CrE outputted from the contour extraction circuit 103 is also inputted to selectors 122 and 125.

Upon receiving a selection signal SEL "0", the selector 122 outputs the contour component CbE received from the contour extraction circuit 102 to a LUT 123. Upon receiving a selection signal SEL "1", the selector 122 outputs the contour component CrE received from the contour extraction circuit 103 to the LUT 123.

Upon receiving a selection signal SEL "0", the selector 125 outputs the contour component CrE received from the contour extraction circuit 103 to a LUT 126. Upon receiving a selection signal SEL "1", the selector 125 outputs the contour component CbE received from the contour extraction circuit 102 to the LUT 126.

The LUT 123 includes a correspondence table for converting the contour component CbE or CrE received from the selector 122 into an adjustment signal K3. The LUT 126 includes a correspondence table for converting the contour component CbE or CrE received from the selector 125 into an adjustment signal K4.

Figure 4:
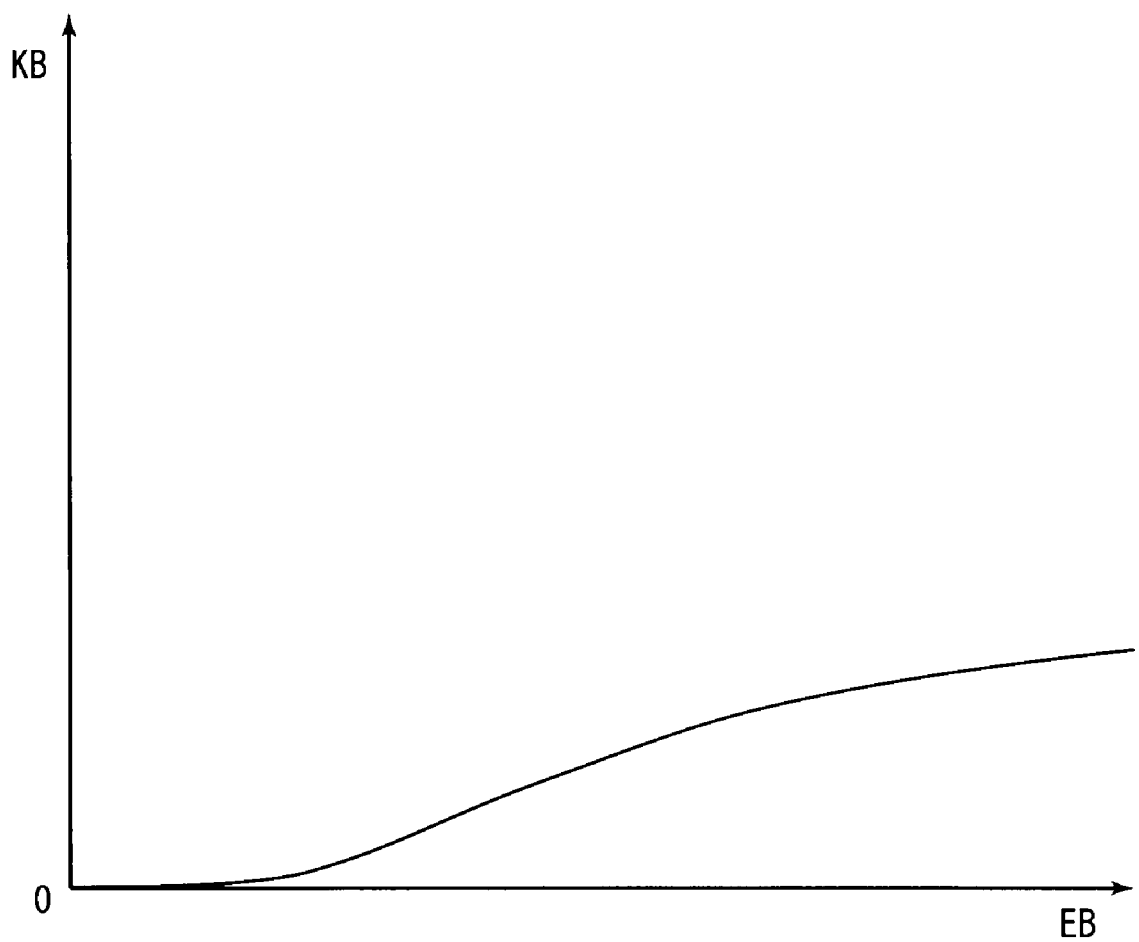
FIG. 4 shows an example of a look-up table.

FIG. 4 shows an example of the correspondence table used in the LUTs 123 and 126. In FIG. 4, the horizontal axis represents a signal value of a contour component EB (the contour component CbE or CrE), which is an input signal, and the vertical axis represents a signal value of an adjustment signal KB (the adjustment signal K3 or K4). In the present embodiment, as shown in FIG. 2, the adjustment signal KB has a value of 0 or more. In other words, the adjustment signal KB acts to add the contour components CbE and CrE to the luminance signal Y.

Although FIG. 4 shows an example of the correspondence table used in the LUTs 123 and 126, the LUTs 123 and 126 can use different correspondence tables from each other. For example, it is possible to generate adjustment signals KB having different characteristics from each other based on the color-difference signals Cb and Cr. It is also possible to weight the contour components of the color-difference signals Cb and Cr by adjusting the correspondence tables used by the LUTs 123 and 126.

The contour component YE outputted from the contour extraction circuit 101 is inputted to an adder 121. The adder 121 adds the contour component YE to the luminance signal Y outputted by the color space converting circuit 17. As a result, a luminance signal Y1 generated, which has been contour-enhanced by the contour component of the luminance signal.

The adjustment signal K3 outputted from the LUT 123 is inputted to an adder 124. The adder 124 adds the adjustment signal K3 to the luminance signal Y1, and outputs a luminance signal Y2, which has been contour-enhanced by the contour component of the color-difference signal. In other words, the luminance signal Y2 is a signal which has been contour-enhanced by the contour component YE of the luminance signal and the contour component of one of the color-difference signals.

The adjustment signal K4 outputted from the LUT 126 is inputted to an adder 127. The adder 127 adds the adjustment signal K4 to the luminance signal Y2, and outputs a luminance signal Yb, which has been contour-enhanced by the contour component of the color-difference signal. In other words, the luminance signal Yb is a signal which has been contour-enhanced by the contour component YE of the luminance signal and the contour components of the two color-difference signals. The contour-enhanced luminance signal Yb and the color-difference signals Cb and Cr are stored in the memory 19.

Thus, the digital camera 1 according to the present embodiment extracts a contour component from a color-difference signal, and enhances the luminance signal by the contour component of the color-difference signal. This effectively enhances, for example, a contour having a small brightness difference or a black contour on a red background, thereby improving the resolution feeling of the image. It goes without saying that the resolution feeling of the image is further effectively improved in the area from which changes both in luminance and color difference have been detected.

In the digital camera 1 of the second embodiment, the contour components YE, CbE, and CrE extracted from the luminance signals Y, the color-difference signals Cb, and Cr, respectively are added independently to the luminance signal Y, which is the original signal. As a result, even in an image area in which brightness difference is too small to extract the contour component YE, the contour component of a color difference component, if extracted, can be added to the luminance signal Y so as to improve the resolution feeling of the image.

Furthermore, in the case where only one of the contour components CbE and CrE is extracted from the color-difference signal Cb or Cr, the extracted contour component is added independently to the luminance signal Y, which is the original signal. This effectively improves the resolution feeling of an image by using the changes in one of the colors.

The digital camera 1 according to the second embodiment can switch the order in which the contour components CbE and CrE are acted using the selectors 122 and 125.

In the second embodiment, as shown in FIG. 4, the LUTs 123 and 126 output a value of 0 or more as the adjustment signal KB. In other words, a luminance signal is enhanced by the contour component of a color-difference signal. Alternatively, it is possible to output a value of less than 0 as the adjustment signal KB.

In the second embodiment, the order in which to add the contour components of the color-difference signals can be switched using the selectors 122 and 125; however, these selectors are dispensable because changing the order of the addition does not change the calculation results.

The contour components of the color-difference signals are converted using the LUTs 123 and 126 in the second embodiment. Alternatively, the contour components of the color-difference signals can be outputted intact to the adders 124 and 127 so as to add the signal values of the contour components intact. In this case, the LUTs 123 and 126 are dispensable.

The image processing apparatus of the present invention is used as the digital camera 1 in these embodiments, but can also be applied to a digital movie camera, a scanner, or the like.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
    an element for extracting a luminance signal, a first color-difference signal, and a second color-difference signal from a pixel signal;
    a luminance contour extraction element for extracting a luminance contour component from said luminance signal;
    a first contour extraction element for extracting a first contour component from said first color-difference signal;
    a second contour extraction element for extracting a second contour component from said second color-difference signal;
    a modulation element for modulating said luminance contour component based on said first contour component, and also modulating said luminance contour component based on said second contour component, thereby generating a modulated contour component; and
    an enhancing element for contour-enhancing said luminance signal by adding said modulated contour component to said luminance signal.

2. The image processing apparatus according to claim 1, further comprising:
    a characteristic adjusting element for adjusting characteristics of said first contour component extracted by said first contour extraction element.

3. The image processing apparatus according to claim 1, further comprising:
    a characteristic adjusting element for adjusting characteristics of said second contour component extracted by said second contour extraction element.

4. The image processing apparatus according to claim 1, further comprising:
    a changing element for changing the order in which to perform a modulation process based on said first contour component and a modulation process based on said second contour component.

5. A digital camera comprising:
    an image pickup apparatus; and
    an image processing apparatus,
    wherein said image processing apparatus includes
    an element for extracting a luminance signal, a first color-difference signal, and a second color-difference signal from a pixel signal;
    a luminance contour extraction element for extracting a luminance contour component from said luminance signal;
    a first contour extraction element for extracting a first contour component from said first color-difference signal;
    a second contour extraction element for extracting a second contour component from said second color-difference signal;
    a modulation element for modulating said luminance contour component based on said first contour component, and also modulating said luminance contour component based on said second contour component, thereby generating a modulated contour component; and
    an enhancing element for contour-enhancing said luminance signal by adding said modulated contour component to said luminance signal.

6. An image processing apparatus comprising:
    an element for extracting a luminance signal and a color-difference signal from a pixel signal;
    a luminance contour extraction element for extracting a luminance contour component from said luminance signal;
    a color-difference contour extraction element for extracting a color-difference contour component from said color-difference signal; and
    an enhancing element for contour-enhancing said luminance signal by adding said luminance contour component to said luminance signal, and adding said color-difference contour component to said luminance signal.

7. The image processing apparatus according to claim 6, wherein:
    said color-difference signal includes a first color-difference signal and a second color-difference signal;
    said color-difference contour extraction element includes:
        a first contour extraction element for extracting a first contour component from said first color-difference signal; and
        a second contour extraction element for extracting a second contour component from said second color-difference signal; and
    said enhancing element adds said first contour component and said second contour component as said color-difference contour component to said luminance signal.

8. The image processing apparatus according to claim 7, further comprising:
    a characteristic adjusting element for adjusting characteristics of said first contour component extracted by said first contour extraction element.

9. The image processing apparatus according to claim 7, further comprising:
    a characteristic adjusting element for adjusting characteristics of said second contour component extracted by said second contour extraction element.

10. The image processing apparatus according to claim 7, further comprising:

a changing element for changing the order in which to perform an enhancement process based on said first contour component, and an enhancement process based on said second contour component.

11. A digital camera comprising:

an image pickup apparatus; and an image processing apparatus, wherein said image processing apparatus includes an element for extracting a luminance signal and a color-difference signal from a pixel signal;

a luminance contour extraction element for extracting a luminance contour component from said luminance signal;

a color-difference contour extraction element for extracting a color-difference contour component from said color-difference signal; and an enhancing element for contour-enhancing said luminance signal by adding said luminance contour component to said luminance signal, and adding said color-difference contour component to said luminance signal.

* * * * *